Oct. 27, 1925.
J. BEGELMAN
1,558,457
AUTOMOBILE BUMPER AND SUPPORT THEREFOR
Filed Nov. 14, 1923
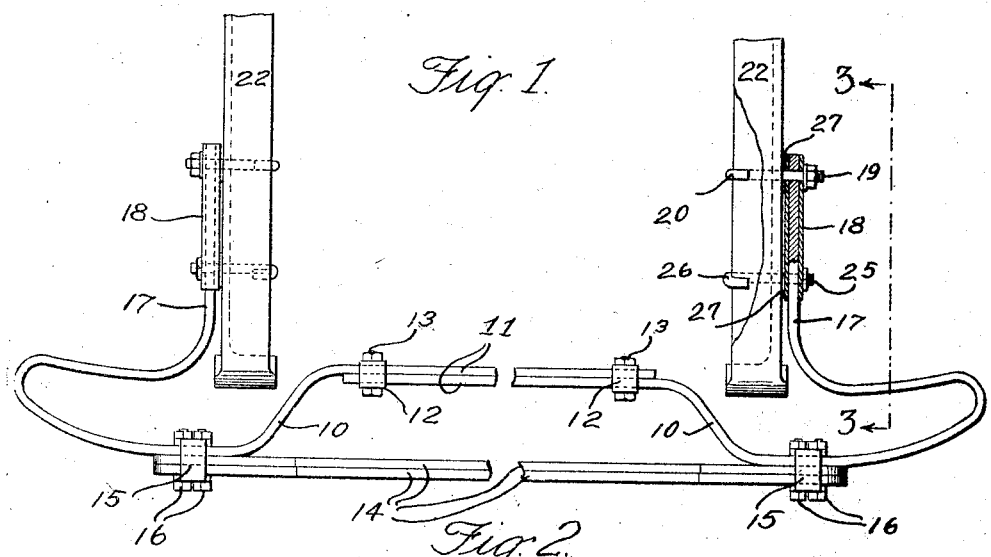
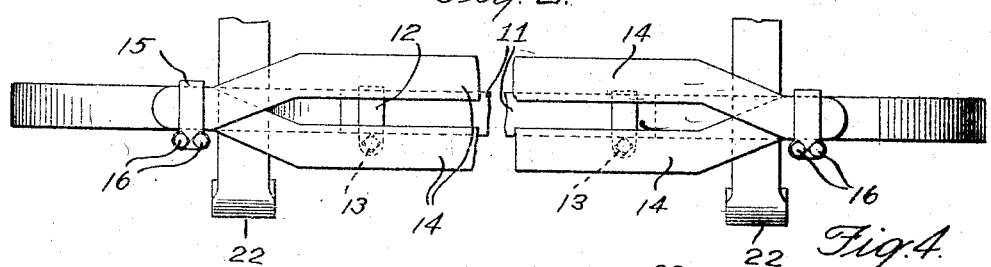
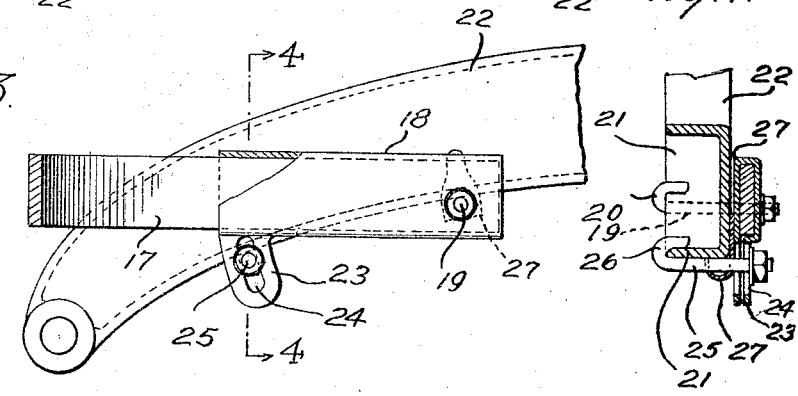
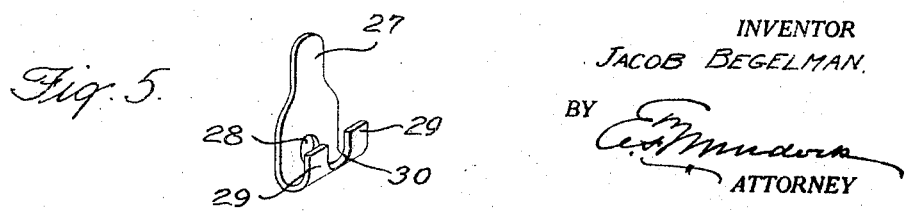
INVENTOR
JACOB BEGELMAN.
BY
ATTORNEY Patented Oct. 27, 1925.

1,558,457

UNITED STATES PATENT OFFICE.

JACOB BEGELMAN, OF BROOKLYN, NEW YORK.

AUTOMOBILE BUMPER AND SUPPORT THEREFOR.

Application filed November 14, 1923. Serial No. 674,778.

*To all whom it may concern*

Be it known that I, JACOB BEGELMAN, a citizen of the United States, and a resident of the city of New York, borough of Brooklyn, in the county of Kings and State of New York, have invented certain new and useful Improvements in Automobile Bumpers and Supports Therefor, of which the following is a full, clear, and exact description.

Among the principal objects which the present invention has in view are: To avoid the destruction of automobile bumpers; to reinforce the bumpers; to secure the same permanently in position without impairment thereof; and to adjust a bumper to the service position desired therefor.

Drawings.

Figure 1 is a top plan view of a bumper and device for securing the same in service, constructed and arranged in accordance with the present invention, and showing in conjunction therewith, fragments of the side bars of the chassis of an automobile.

Figure 2 is a front view of the same.

Figure 3 is a detail view on enlarged scale showing a portion of a bumper and one of the sockets for holding the same in service position on the forward extremity of the side bar of an automobile chassis.

Figure 4 is a cross section thereof, the section being taken on the line 4—4 in Figure 3.

Figure 5 is a detail view in perspective of a positioning washer with which the bumper and socket are provided.

Description.

As seen best in the drawings, a bumper when constructed and arranged in accordance with the present invention is preferably formed in two half portions or sections.

The sections 10 have preferably back set lapping portions 11, which in service are held rigidly in position by clips 12, the lower ends whereof are perforated to receive tightening bolts 13. In front of the back set portions 11 are striking plates 14 shaped substantially as shown best in Figure 2 of the drawings.

The ends of the plates 14 are lapped and are fastened to the sections 10 by means of clips 15, the lower edges of which are spaced apart to be contracted by bolts 16. When the bolts 16 and 13 are loosened, it is obvious the half sections of the bumper may be spread or contracted for adjustment to various car or automobile chassis constructions. The plates 14 remain in substantially the same position at all times.

The rear extremities 17 of the sections 10 are preferably straight as shown best in Fig. 3 of the drawings, or without the bend usually provided to accommodate the adjustment of the bumper to the frame of various automobiles. By maintaining the extremities 17 straight and in line with the direction of the impact to which the bumper is subject, the maximum strength in the extremities is maintained.

Further, the straight extremities facilitate the introduction thereof within the socket sleeves 18 forming part of the present invention.

The sleeves 18 are constructed of any suitable material such as sheet metal, blank and bent to form a pocket for the extremities 17. Adjacent the rear end of the socket 18, perforations are provided for receiving the anchor bolt 19.

The bolt 19 as seen best in Figure 4 of the drawings is provided with an anchor hook 20 which in service extends over and grips firmly the flange 21 of the side bar 22 of the automobile. It will be observed that the perforation for the bolt 19 is adjacent the rear end of the socket 18 and is so positioned that the bolt 19 passes below the flange 21 of the side bar of the chassis thereby avoiding any impairment to the strength of the said side bar. It will also be observed that a perforation is formed in the extremities 17 corresponding with the perforations for the bolt 19. Through the perforation thus formed in the said extremities, the bolt 19 also passes.

It is obvious that the bolt hole for the bolt 19 does not impair the resisting strength of the extremities 17. No other bolt hole is made in these extremities, the vertical adjustment of the bumper being provided for by the dropped bracket 23, wherein is provided an elongated slot 24 through which is passed a bolt 25 at the extremity of which is the hook 26, similar to the hook 20 of the bolt 19, and likewise adapted for engaging to hold the flange 21 of the side bar of the chassis.

It is obvious that if the stress on the bolt 25 is released, the socket 18 pivoting on the bolt 19 may be raised and lowered, the bolt 25 sliding within the slot 24 which is preferably concentric with the perforation of the bolt 19. Raising and lowering the forward end of the socket 18 has a corresponding rise and depression of the forward end of the bumper and of the position of the plates 14 thereof.

The washers 27 shown in Figure 5 of the drawings have a perforation 28 through which the bolts 19 and 25 may be passed. The upturned bracket edges 29 of the bracket 27 are spaced apart, a passageway 30 being formed therebetween for the passage of the said bolts.

As seen best in Figure 4 of the drawings, the washers 27 are disposed between the sockets 18 and the side bar 22. This avoids marring the side bar and serves further to secure the proper alinement of the socket for the work for which it is designed.

As seen best in Fig. 4 of the drawings, the bracket 23 is preferably constructed of two pieces pendent from the bracket 18.
These pieces are preferably spaced apart to provide for contracting the sides of the socket 18 upon the extremities 17 enclosed therein. Provision is thus made for using different thicknesses of metal for constructing the sections 10.

Claims.

1. The combination of a bumper having supporting terminals; a plurality of engaging enveloping sockets therefor; and means for operatively mounting said sockets on the side bars of automobile chassis, said means embodying a plurality of anchoring hooks adapted to engage the said side bars.
2. The combination of a bumper having supporting terminals; a plurality of engaging enveloping sockets therefor; and means for operatively mounting said sockets on the side bars of automobile chassis, said means embodying a plurality of anchoring hooks adapted to engage the said side bars; and means for maintaining the operative relation of said terminals and said sockets.

3. The combination of a bumper having supporting terminals; a plurality of engaging enveloping sockets therefor; and means for operatively mounting said sockets on the side bars of automobile chassis, said means embodying a plurality of anchoring hooks adapted to engage the said side bars; and means for maintaining the operative relation of said terminals and said sockets, said means embodying screw-threaded members, each passing through the sides of said socket; and a perforation formed adjacent the ends of said terminals.

4. The combination of a bumper having supporting terminals; a plurality of engaging enveloping sockets therefor; and means for operatively mounting said sockets on the side bars of automobile chassis, said means embodying a plurality of anchoring hooks adapted to engage the said side bars; and means for maintaining the operative relation of said terminals and said sockets, said means embodying screw-threaded members, each passing through the sides of said socket; and a perforation formed adjacent the ends of said terminals, said screw-threaded member having a hook extension beyond the side of said socket for engaging the flange of said side bars.

5. A socket for supporting in service an automobile bumper having supporting terminals, said socket having separable sides adapted to close upon said terminals, said sides having slotted pendent brackets; and a plurality of anchoring members for operatively engaging the side bars of an automobile, said members having screw-threaded extensions and nuts thereon for pressing the socket and bumper element contained therein against the side bars of an automobile.

6. A socket for supporting in service an automobile bumper having supporting terminals, said socket having separable sides adapted to close upon said terminals, said sides having slotted pendent brackets; and a plurality of anchoring members for operatively engaging the side bars of an automobile, said members having screw-threaded extensions and nuts thereon for pressing the socket and bumper element contained therein against the side bars of an automobile, one of said screw-threaded members extending through the slots in the pendent brackets for pressing the pendent brackets against the side bar of the automobile.

7. A socket for supporting in service an automobile bumper having supporting terminals, said socket having separable sides adapted to close upon said terminals, said sides having slotted pendent brackets; and a plurality of anchoring members for operatively engaging the side bars of an automobile, said members having screw-threaded extensions and nuts thereon for pressing the socket and bumper element contained therein against the side bars of an automobile, one of said screw-threaded members extending through the slots in the pendent brackets against the side bar of the automobile; and a plurality of guiding washers having thread-engagement with the screw-threaded member for extension between the socket and said side bars.

8. A socket for supporting in service an automobile bumper having supporting terminals, said socket having separable sides adapted to close upon said terminals, said sides having slotted pendent brackets; and a plurality of anchoring members for operatively engaging the side bars of an automobile, said members having screw-threaded extensions and nuts thereon for pressing the socket and bumper element contained therein against the side bars of an automobile, one of said screw-threaded members extending through the slots in the pendent brackets against the side bar of the automobile; and a plurality of guiding washers adapted for engagement with the screw-threaded member for extension between the socket and said side bars; said washers having upturned members extending below for engaging the underside of said side bars.

JACOB BEGELMAN.